US009315106B2

(12) United States Patent
Fu et al.

(10) Patent No.: US 9,315,106 B2
(45) Date of Patent: Apr. 19, 2016

(54) COMPUTERIZED EVALUATION OF RESOLVER SENSOR SIGNALS TO DETERMINE ROTOR POSITION IN AN ELECTRICAL MACHINE FOR A VEHICLE

(75) Inventors: Chengxuan Fu, Kirchheim (DE); Wilfried Feuchter, Kupferzell (DE); Rene Bischof, Tabarz (DE)

(73) Assignee: Robert Bosch GmbH, Stuttgart (DE)

( * ) Notice: Subject to any disclaimer, the term of this patent is extended or adjusted under 35 U.S.C. 154(b) by 56 days.

(21) Appl. No.: 14/130,765

(22) PCT Filed: May 15, 2012

(86) PCT No.: PCT/EP2012/059054
§ 371 (c)(1),
(2), (4) Date: Feb. 3, 2014

(87) PCT Pub. No.: WO2013/004424
PCT Pub. Date: Jan. 10, 2013

(65) Prior Publication Data
US 2014/0142782 A1      May 22, 2014

(30) Foreign Application Priority Data
Jul. 4, 2011   (DE) .......................... 10 2011 078 583

(51) Int. Cl.
*B60L 3/12*    (2006.01)
*B60L 3/00*    (2006.01)
*G01D 5/20*    (2006.01)

(52) U.S. Cl.
CPC .................. *B60L 3/12* (2013.01); *B60L 3/0038* (2013.01); *B60L 3/0061* (2013.01); *B60L 3/0084* (2013.01); *G01D 5/2073* (2013.01); *B60L 2240/421* (2013.01); *Y02T 10/642* (2013.01)

(58) Field of Classification Search
CPC ............ B60L 2240/421; B60L 3/0038; B60L 3/0061; B60L 3/0084; B60L 3/12; G01D 5/2073; Y02T 10/642
USPC ..................................................... 324/207.18
See application file for complete search history.

(56) References Cited

U.S. PATENT DOCUMENTS 7,119,506 B1    10/2006  Kamiya

FOREIGN PATENT DOCUMENTS

| CN | 1801596 | 7/2006 |
| CN | 101110559 | 1/2008 |
| CN | 201667630 | 12/2010 |
| DE | 10050383 | 5/2001 |
| EP | 1153783 | 11/2001 |
| EP | 2161831 | 3/2010 |

OTHER PUBLICATIONS

International Search Report for Application No. PCT/EP2012/059054 dated Mar. 18, 2013 (English Translation, 2 pages).

*Primary Examiner* — Jay Patidar
(74) *Attorney, Agent, or Firm* — Michael Best & Friedrich LLP

(57) ABSTRACT

Circuit for evaluating resolver sensor signals (28) in a vehicle, having a resolver sensor (4), set up to pick up a rotary movement of a rotor (6) in an electrical machine (16), and a processor element (12), wherein the resolver sensor (4) is set up to output at least one sinusoidal or cosinusoidal amplitude-modulated analog signal that is characteristic of the rotary movement of the rotor (6), characterized in that the processor element (12) has a data processing unit (12a), a resolver sensor actuation unit (12b) and a resolver sensor evaluation unit (12c), wherein the analog signal from the resolver sensor (4) is connected directly to the resolver sensor evaluation unit (12c).

12 Claims, 4 Drawing Sheets

COMPUTERIZED EVALUATION OF RESOLVER SENSOR SIGNALS TO DETERMINE ROTOR POSITION IN AN ELECTRICAL MACHINE FOR A VEHICLE

BACKGROUND OF THE INVENTION

The present invention relates to drives for electric and hybrid vehicles. In particular, the present invention relates to determining a rotary movement of an electrical machine. Further particularly, the present invention relates to a circuit for evaluating the resolver sensor signals in a vehicle, to a controller for a vehicle, having a circuit according to the invention, and also to a vehicle, in particular an automobile, having a circuit according to the invention and/or a controller according to the invention.

In electric and hybrid vehicles, a drive power for the vehicle is supplied, at least partially, by an electrical machine, and therefore to an electric motor. In order to actuate an electrical machine of this kind in a preferred manner, it is usually useful to determine accurate information about the current operating state of the electrical machine.

In order to determine said information in this way, a so-called resolver sensor on the electrical machine is usually used, said resolver sensor being used to detect the rotation speed and angular position of the rotor of an electrical machine.

Rotation speed and angular position are of central importance for motor control. An evaluation logic system is used in order to evaluate the raw data, which is supplied by the resolver sensor, in such a way that the required measurement variables of rotation speed and angular position are supplied to a controller, for example in the form of digital data values.

FIG. 1 shows a conventional resolver sensor with rotor excitation.

Winding 10a is fitted to the rotor 6 of an electrical machine. Said winding is excited by a sinusoidal AC voltage. Two windings 10b, 10c which are fitted to the stator with a perpendicular orientation in relation to one another receive a voltage which is induced by winding 10a.

The amplitudes of the voltages which are induced in the windings 10b, 10c are determined in this case by the angle of the rotor or of the winding 10a and in this case correspond in each case to the sine and cosine of the angular position of the rotor.

However, resolver sensor and evaluation logic system are usually only simply present.

FIG. 2 shows a conventional evaluation arrangement of a resolver sensor 4.

In this case, controller 20 has microprocessor 12 which actuates a resolver actuation/evaluation circuit 14, a so-called resolver chip 14 or resolver digital converter circuit 14, by means of a reference signal 25. Said resolver actuation/evaluation circuit 14 is supplied, by way of example, with a voltage of 5 $V_{dc}$.

In this case, resolver chip 14 generates, by way of example, an excitation signal waveform, for example sinusoidal oscillation at 10 kHz and with ±2.5 $V_{Peak}$. This sinusoidal oscillation is converted into an excitation signal waveform with ±10 $V_{Peak}$ by means of an amplifier element 18 and fed to the resolver sensor 4 in winding 10a.

Therefore, region 26 represents the resolver actuation. Resolver sensor 4 is schematically illustrated in a manner fitted to the motor of an electrical machine 16.

The resolver sensor data 28 is in turn supplied by means of filter element 22, for example a low-pass filter, to the resolver chip 14 as sine or cosine signals with, for example, ±2.85 $V_{peak}$.

The resolver chip 14 itself is connected to microprocessor 12 via data link 24a and supplies digital signal values relating to the rotation speed and angular position of the rotor of the electrical machine 16 to the microprocessor 12. Furthermore, fault information is made available to the microprocessor 12 via data link 24a.

The evaluation logic system can contain simple diagnosis of the resolver sensor signals which identifies various types of fault in the resolver signals.

However, this fault information generally does not contain faults which occur within the resolver chip since these cannot be sufficiently well detected or the resolver chip does not have suitably internal provisions in order to be able to itself check that it is operating in a fault-free manner.

Therefore, faults within the evaluation logic system itself and in the transmission of data to a further-processing microprocessor of a controller usually cannot be identified. These faults include, for example, register faults, data bit faults, addressing faults of the evaluation logic system, frozen data, independent reconfiguration of the evaluation logic system, and defects in computation units, etc.

Undetectable faults of this kind can therefore result in faulty rotation speed and angle values being transmitted, but these nevertheless being considered to be valid by a downstream controller and possibly resulting in, therefore faulty, actuation of the motor. Such faulty control of the motor can therefore lead to this kind of faulty actuation of the electrical machine, and therefore said electrical machine executes a rotary movement which is not adequate for the situation or operates with an undesired torque. The risk of "undesired vehicle movement" or "undesired vehicle movement direction" can also be caused by failure of the resolver chip.

Faulty actuation of this kind can lead, for example, to undesired acceleration of the vehicle, to blocking of the drive axle, or even to destruction of the IGBTs which actuate the motor.

SUMMARY OF THE INVENTION

Therefore, one aspect of the present invention can be considered to be that of performing resolver sensor evaluation independently of a resolver chip in order to thereby avoid faults as can occur within the evaluation logic system and in the subsequent data transmission of the evaluated sensor signals to a microprocessor, for example a controller.

A resolver chip is generally comparatively expensive, requires space on a printed circuit board of a controller for its design, generally uses at least 16 data lines for transmitting data to a microprocessor and is generally a complex component which usually cannot be sufficiently monitored and tested during operation of the controller. Software for configuration and communication with a resolver chip is comparatively complex.

Accordingly, evaluation of the resolver sensor signals is performed directly in a microprocessor in the present case. As a result, the resolver chip can be completely dispensed with, as a result of which component costs and hardware production costs can be reduced, for example due to smaller printed circuit boards with fewer conductor tracks.

The microprocessor used can be the same microprocessor which is also used for actuating or providing the reference signal for the resolver sensor. A microprocessor of this kind can generally be very well secured and monitored. Measures, such as a RAM or ROM test, sequence control or else monitoring by external watchdog systems for example, can sufficiently secure safety-relevant hardware and software components on a microprocessor, for example the components for evaluating resolver sensor signals.

Therefore, signal processing of the analog resolver sensor signals is performed substantially directly in the microprocessor and not in a separately mounted circuit logic system, such as even the resolver chip. In this case, individual parts of the microprocessor can perform signal generation, for example of the exciter signal of the resolver sensor, signal evaluation or conversion of the analog signals which are supplied by the sensor, and also signal processing.

Since all modules 12a, 12b, 12c are constituent parts of a microprocessor 12, the total manner of operation of the individual modules can be checked using the conventional safety measures of the microprocessor and correct functioning can be verified.

BRIEF DESCRIPTION OF THE DRAWINGS

Exemplary embodiments of the invention are illustrated in the drawings and explained in greater detail in the following description.

In the drawings.

DETAILED DESCRIPTION

Figure 3A:
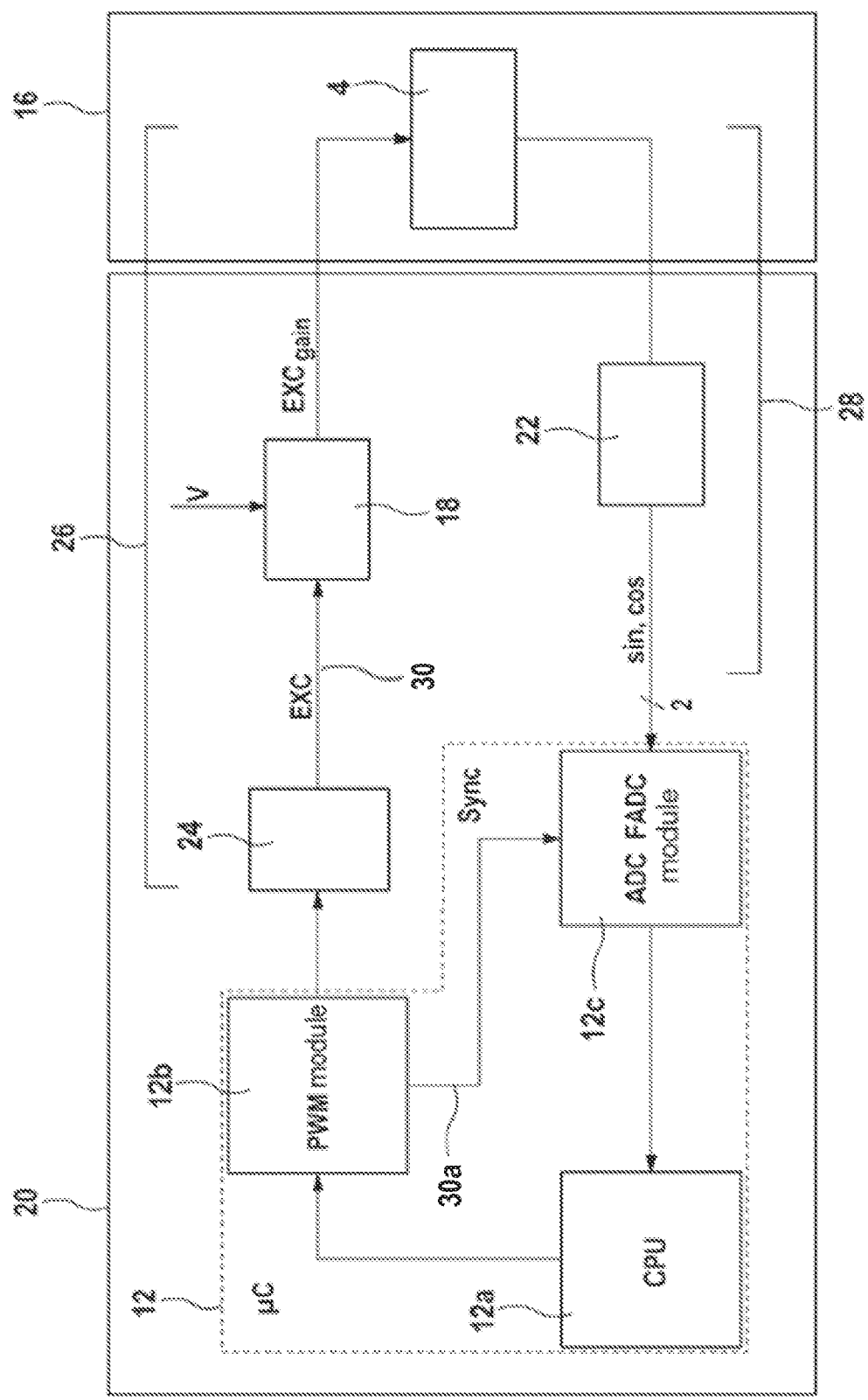
FIGS. 3a, b show an exemplary refinement of a resolver sensor signal evaluation arrangement according to the present invention.
Figure 3B:
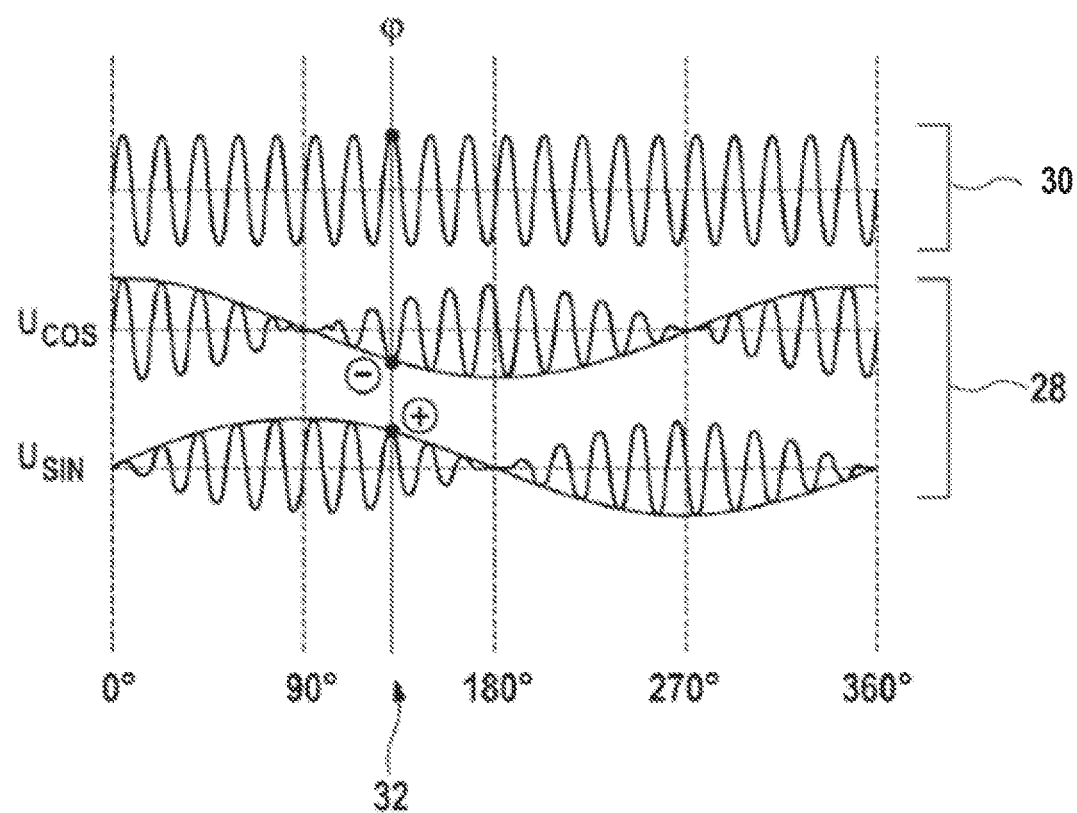

Furthermore, making reference to FIGS. 3a, 3b, an exemplary refinement of a resolver sensor signal evaluation arrangement according to the present invention is illustrated.

Figure 1:
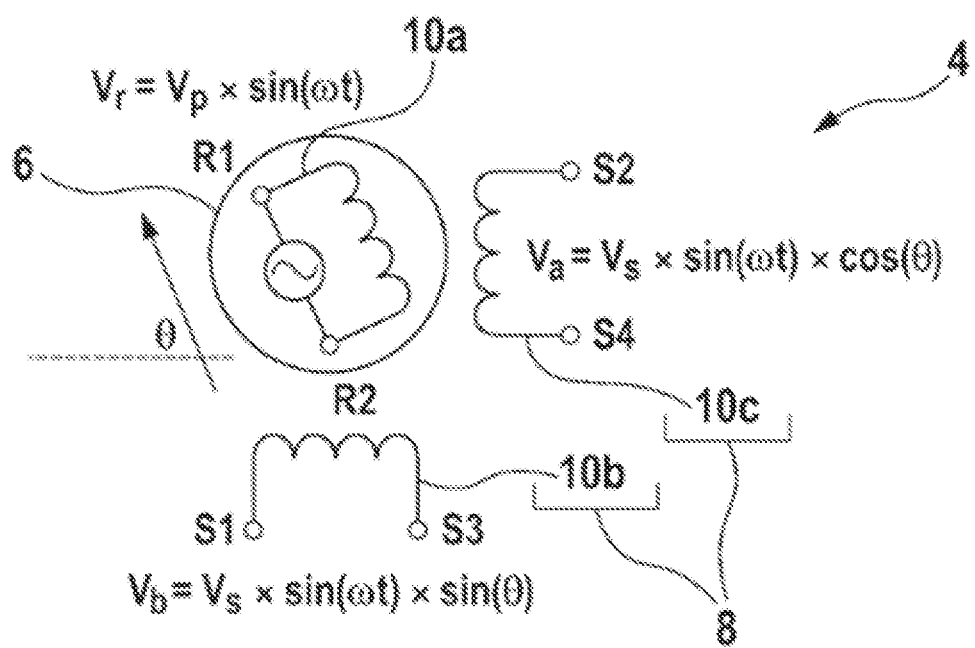
FIG. 1 shows a resolver sensor.
Figure 2:
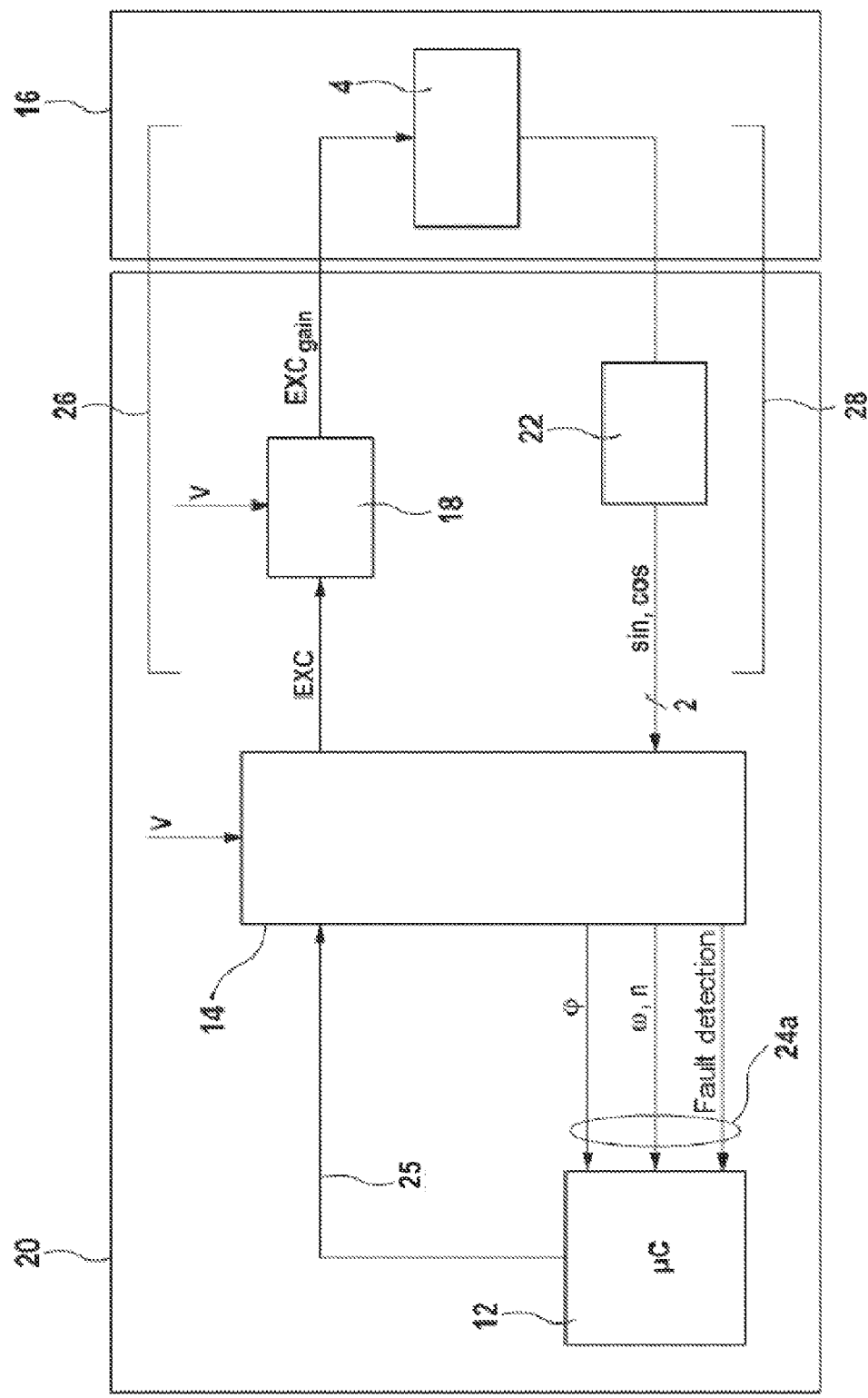
FIG. 2 shows an exemplary refinement of a circuit arrangement of resolver sensor system and resolver evaluation logic system.

FIG. 3a comprises a design of the controller 20 which is comparable to that of FIG. 2, but with the resolver chip 14 having been replaced by implementation entirely in the microprocessor 12. To this end, microprocessor 12 has the individual modules of processor element 12a, pulse-width-modulation module 12b, and also analog/digital converter or fast analog/digital converter module 12c. The links between the individual modules are indicated in the microprocessor 12 by arrows.

PWM module 12b is actuated by processor module 12a and, together with external digital/analog converter 24, generates the excitation signal of the resolver sensor 4, for example a sine signal at 10 kHz and with ±2.5 $V_{Peak}$. The pulse-width-modulation module 12b of the microprocessor 12 generates square-wave signals which in turn are converted into the sinusoidal exciter signal 30 by an external digital/analog converter 24. A particularly simple embodiment of the PWM module 12b is a low-pass filter.

Furthermore, amplifier element 18 is used, said amplifier element having, by way of example, a voltage supply of 30 $V_{dc}$, and in this case generating an excitation voltage of ±10 $V_{Peak}$ and forwarding said voltage to the resolver sensor 4 of the electrical machine 16. Therefore, external digital/analog converter element 24 and amplifier element 18 produce the resolver actuation arrangement 26.

Resolver signals 28 are converted into sine or cosine signals with, for example, ±2.85 $V_{peak}$, using the filter element 22, by way of example a low-pass filter.

A trigger signal or a sync signal 30a is generated in synchronism with the exciter signal, said trigger signal or sync signal actuating the analog/digital converter or fast analog/digital converter 12c, in particular sampling thereof.

A fast ADC has a considerably faster conversion time in comparison to a normal ADC, as a result of which signals can be detected with a higher frequency.

FIG. 3b shows the curve profile of the sinusoidal exciter signal 30 and also the output of each of the two stator windings of the resolver sensor 4 as resolver sensor signal 28.

On account of the sampling 32 which is triggered by the sync signal 30a and which is performed, by way of example, in each case at the positive peak of the sinusoidal exciter signal 30, the envelope of the sine or cosine signal is substantially generated, as shown in FIG. 3b. Therefore, the resolver sensor data 28 is demodulated using the analog/digital converter module 12c. The resolver sine/cosine signals 28 are always detected by the analog/digital converter when the sinusoidal exciter signal 30 reaches its maximum, this correlating substantially with the sync signal 30a.

Said signals, which are demodulated by means of the analog/digital converter or fast analog/digital converter 12c, can be further processed by simple mathematical operations in such a way as to determine the position and speed of the resolver sensor or of the rotor. In addition, a diagnosis or plausibility check can be carried out by the signals in order to identify short circuits for example.

The invention claimed is:

1. A circuit for evaluating resolver sensor signals from an electrical machine of a vehicle, the circuit comprising:
    a resolver sensor configured to sense a rotary movement of a rotor of the electrical machine and to output at least one sinusoidal or cosinusoidal amplitude-modulated analog signal indicative of the rotary movement of the rotor; and
    an electronic processor;
    wherein
    the electronic processor has a data processing unit, a resolver sensor actuation unit and a resolver sensor evaluation unit,
    the at least one sinusoidal or cosinusoidal amplitude-modulated analog signal of the resolver sensor is received by the resolver sensor evaluation unit.

2. The circuit as claimed in claim 1,
    wherein the resolver sensor actuation unit supplies a pulse-width-modulated signal for actuating the resolver sensor, and also a synchronization signal to the resolver sensor evaluation unit.

3. The circuit as claimed in claim 2,
    wherein the circuit has a digital/analog converter element for converting the pulse-width-modulated signal into a sinusoidal analog exciter signal for actuating the resolver sensor.

4. The circuit as claimed in claim 3, wherein the digital/analog converter element is in the form of a low-pass element.

5. The circuit as claimed in claim 2,
    wherein the synchronization signal provides a sampling interval for demodulation of the at least one sinusoidal or cosinusoidal amplitude-modulated analog signal of the resolver sensor by the resolver sensor evaluation unit.

6. The circuit as claimed in claim 2,
    wherein the synchronization signal triggers analog/digital conversion of the current value of the at least one sinusoidal or cosinusoidal amplitude-modulated analog signal of the resolver sensor by the resolver sensor evaluation unit.

7. The circuit as claimed in claim 6,
wherein the analog/digital conversion supplies an envelope of the at least one sinusoidal or cosinusoidal amplitude-modulated analog signal to the data processing unit of the electronic processor.

8. The circuit as claimed in claim 1,
wherein the resolver sensor evaluation unit is in the form of an analog/digital converter.

9. A controller for a vehicle, having a circuit as claimed in claim 1.

10. The circuit as claimed in claim 1, wherein the circuit is included in a controller that is located in the vehicle.

11. The circuit as claimed in claim 1, wherein the circuit is included in the vehicle.

12. A circuit for evaluating resolver sensor signals in a vehicle, the circuit comprising:
   a resolver sensor configured to sense a rotary movement of a rotor of an electrical machine and to output at least one sinusoidal or cosinusoidal amplitude-modulated analog signal indicative of the rotary movement of the rotor; and
   an electronic processor including a data processing unit, a resolver sensor actuation unit and a resolver sensor evaluation unit,
   wherein the at least one sinusoidal or cosinusoidal amplitude-modulated analog signal of the resolver sensor is received by the resolver sensor evaluation unit,
   wherein the resolver sensor actuation unit supplies an excitation signal for actuating the resolver sensor, and also a synchronization signal to the resolver sensor evaluation unit,
   wherein the synchronization signal provides demodulation of the at least one sinusoidal or cosinusoidal amplitude-modulated analog signal of the resolver sensor by the resolver sensor evaluation unit, and
   wherein the synchronization signal in synchronism with the excitation signal triggers a sample of the at least one sinusoidal or cosinusoidal amplitude-modulated analog signal at the resolver sensor evaluation unit such that the at least one sinusoidal or cosinusoidal amplitude-modulated analog signal is sampled by an analog-to-digital converter when the excitation signal reaches a maximum whereby the demodulation of the at least one sinusoidal or cosinusoidal amplitude-modulated analog signal occurs, and whereby a position and a speed of the rotor is ascertained.

* * * * *